(12) United States Patent
Okahisa et al.

(10) Patent No.: US 9,440,363 B2
(45) Date of Patent: Sep. 13, 2016

(54) ROBOT AND MANUFACTURING METHOD OF THE SAME

(71) Applicant: KABUSHIKI KAISHA YASKAWA DENKI, Kitakyushu-shi (JP)

(72) Inventors: Manabu Okahisa, Fukuoka (JP); Takahiko Kanamori, Fukuoka (JP); Tatsuo Hiro, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 50 days.

(21) Appl. No.: 14/340,488

(22) Filed: Jul. 24, 2014

(65) Prior Publication Data
US 2015/0027261 A1    Jan. 29, 2015

(30) Foreign Application Priority Data

Jul. 26, 2013 (JP) ................................. 2013-156047
Sep. 19, 2013 (JP) ................................. 2013-194709

(51) Int. Cl.
| | |
|---|---|
| B23K 37/00 | (2006.01) |
| B25J 18/04 | (2006.01) |
| B25J 19/00 | (2006.01) |

(52) U.S. Cl.
CPC ............... B25J 18/04 (2013.01); B25J 19/007 (2013.01); B25J 19/0025 (2013.01); *Y10T 29/49174* (2015.01); *Y10T 74/20311* (2015.01)

(58) Field of Classification Search
None
See application file for complete search history.

(56) References Cited

U.S. PATENT DOCUMENTS

| | | | |
|---|---|---|---|
| 4,394,533 A | 7/1983 | Naito | |
| 4,518,308 A | 5/1985 | Grzybowski et al. | |
| 4,780,047 A | 10/1988 | Holt et al. | |
| 4,973,215 A | 11/1990 | Karlen et al. | |
| 5,046,375 A | 9/1991 | Salisbury, Jr. et al. | |
| 5,155,423 A | 10/1992 | Karlen et al. | |
| 5,437,207 A * | 8/1995 | Zimmer ..................... | 74/490.02 |
| 5,784,542 A | 7/1998 | Ohm et al. | |
| 6,288,512 B1 | 9/2001 | Berninger et al. | |
| 6,394,998 B1 * | 5/2002 | Wallace et al. .................. | 606/1 |
| 6,408,710 B1 | 6/2002 | Kullborg et al. | |
| 7,104,153 B2 | 9/2006 | Matsumoto et al. | |
| 7,322,258 B2 | 1/2008 | Shiraki et al. | |

(Continued)

FOREIGN PATENT DOCUMENTS

| | | | |
|---|---|---|---|
| DE | 10141407 | 10/2002 | |
| EP | 1083030 A2 * | 3/2001 | ............. B25J 19/00 |

(Continued)

OTHER PUBLICATIONS

Japanese Office Action for corresponding JP Application No. 2013-194709, Jul. 21, 2015.

(Continued)

*Primary Examiner* — Kiley Stoner
(74) *Attorney, Agent, or Firm* — Mori & Ward, LLP

(57) ABSTRACT

A robot according to an aspect of an embodiment includes a robot arm, an attaching portion, an end effector, an end-effector-side cable, and a robot-side cable. The attaching portion is provided on a leading end of the robot arm. The end effector is attached to the attaching portion. The end-effector-side cable extends from the end effector. The robot-side cable is arranged along the robot arm and is connected to the end-effector-side cable by terminal connection at a position closer to the end effector than the attaching portion.

11 Claims, 5 Drawing Sheets

(56) References Cited

U.S. PATENT DOCUMENTS

| | | | |
|---|---|---|---|
| 7,540,214 B2 | 6/2009 | Iwai et al. | |
| 7,650,852 B2 | 1/2010 | Clifford et al. | |
| 8,347,753 B2 | 1/2013 | Larsson | |
| 8,629,350 B2 | 1/2014 | Ljungkvist | |
| 8,631,720 B2 | 1/2014 | Nakagiri et al. | |
| 9,254,575 B2 | 2/2016 | Murakami | |
| 2004/0200304 A1 | 10/2004 | Matsumoto et al. | |
| 2005/0011295 A1 | 1/2005 | Shiraki et al. | |
| 2005/0034552 A1 | 2/2005 | Back et al. | |
| 2006/0117896 A1* | 6/2006 | Kidooka et al. | 74/490.02 |
| 2006/0196300 A1* | 9/2006 | Kidooka et al. | 74/490.01 |
| 2009/0114052 A1* | 5/2009 | Haniya et al. | 74/490.03 |
| 2009/0139364 A1 | 6/2009 | Forslund et al. | |
| 2009/0224109 A1* | 9/2009 | Hasunuma et al. | 248/52 |
| 2010/0043587 A1* | 2/2010 | Broberg et al. | 74/490.01 |
| 2011/0010011 A1* | 1/2011 | Oka et al. | 700/258 |
| 2011/0252913 A1* | 10/2011 | Ibayashi et al. | 74/490.02 |
| 2011/0252914 A1* | 10/2011 | Ibayashi et al. | 74/490.02 |
| 2012/0067157 A1* | 3/2012 | Suzuki et al. | 74/490.02 |
| 2012/0111135 A1* | 5/2012 | Ichibangase et al. | 74/490.06 |
| 2013/0098190 A1 | 4/2013 | Pan | |
| 2013/0168505 A1 | 7/2013 | Ljungkvist | |
| 2013/0305869 A1 | 11/2013 | Krumbacher | |
| 2013/0306603 A1* | 11/2013 | Ferrero et al. | 219/86.25 |
| 2014/0030032 A1* | 1/2014 | Kuhn | 406/196 |
| 2014/0083229 A1* | 3/2014 | Kume | 74/490.02 |
| 2014/0103168 A1* | 4/2014 | Kume | 248/51 |
| 2014/0109712 A1* | 4/2014 | Ono | 74/490.02 |
| 2014/0130631 A1* | 5/2014 | Kume | 74/490.02 |
| 2014/0137685 A1* | 5/2014 | Iwayama | 74/490.02 |
| 2014/0196563 A1* | 7/2014 | Takahashi et al. | 74/490.06 |
| 2014/0290415 A1* | 10/2014 | Hasuo | 74/490.02 |
| 2015/0007681 A1* | 1/2015 | Murakami | 74/490.02 |
| 2015/0034698 A1* | 2/2015 | Takahashi et al. | 228/33 |
| 2015/0039125 A1* | 2/2015 | Takahashi et al. | 700/245 |
| 2015/0059511 A1* | 3/2015 | Mushikami et al. | 74/490.06 |
| 2015/0114162 A1 | 4/2015 | Kirihara et al. | |

FOREIGN PATENT DOCUMENTS

| | | | | |
|---|---|---|---|---|
| EP | 1243384 A1 * | 9/2002 | | B25J 17/02 |
| EP | 1352721 A1 * | 10/2003 | | B25J 19/00 |
| EP | 2450158 A1 * | 5/2012 | | |
| EP | 2551068 | 1/2013 | | |
| EP | 2829368 A2 * | 1/2015 | | |
| EP | 2829369 A2 * | 1/2015 | | |
| JP | 59169687 A * | 9/1984 | | B23K 11/28 |
| JP | 62-199380 | 9/1987 | | |
| JP | 1-118882 U | 8/1989 | | |
| JP | 2-124694 U | 10/1990 | | |
| JP | 6-508303 A | 9/1994 | | |
| JP | 09-32531 | 2/1997 | | |
| JP | 2004-299002 A | 10/2004 | | |
| JP | 2005288560 A * | 10/2005 | | B25J 19/00 |
| JP | 2008-136925 | 6/2008 | | |
| JP | 5151513 B2 | 8/2009 | | |
| JP | 2012-96332 A | 5/2012 | | |
| JP | 2012196766 A * | 10/2012 | | |
| WO | WO 03037577 A1 * | 5/2003 | | |

OTHER PUBLICATIONS

Japanese Office Action for corresponding JP Application No. 2013-156047, May 12, 2015.

Chinese Office Action for corresponding CN Application No. 201410244697.7, Aug. 27, 2015.

Japanese Office Action for corresponding JP Application No. 2013-194709, Feb. 2, 2016.

Office Action with Form PTO-892 Notice of References Cited issued by the U.S. Patent and Trademark Office for the co-pending U.S. Appl. No. 14/340,494, Dec. 4, 2015.

Chinese Office Action for corresponding CN Application No. 201410332521.7, Sep. 25, 2015.

Japanese Office Action for corresponding JP Application No. 2013-156047, Oct. 27, 2015.

Extended European Search Report for corresponding EP Application No. 14178132.8-1712, Apr. 1, 2016.

Extended European Search Report for corresponding EP Application No. 14178133.6-1712, Apr. 1, 2016.

Chinese Office Action for corresponding CN Application No. 201410332521.7, Jun. 2, 2016.

Office Action issued by the U.S. Patent and Trademark Office for the co-pending U.S. Appl. No. 14/340,494, Jun. 17, 2016.

* cited by examiner

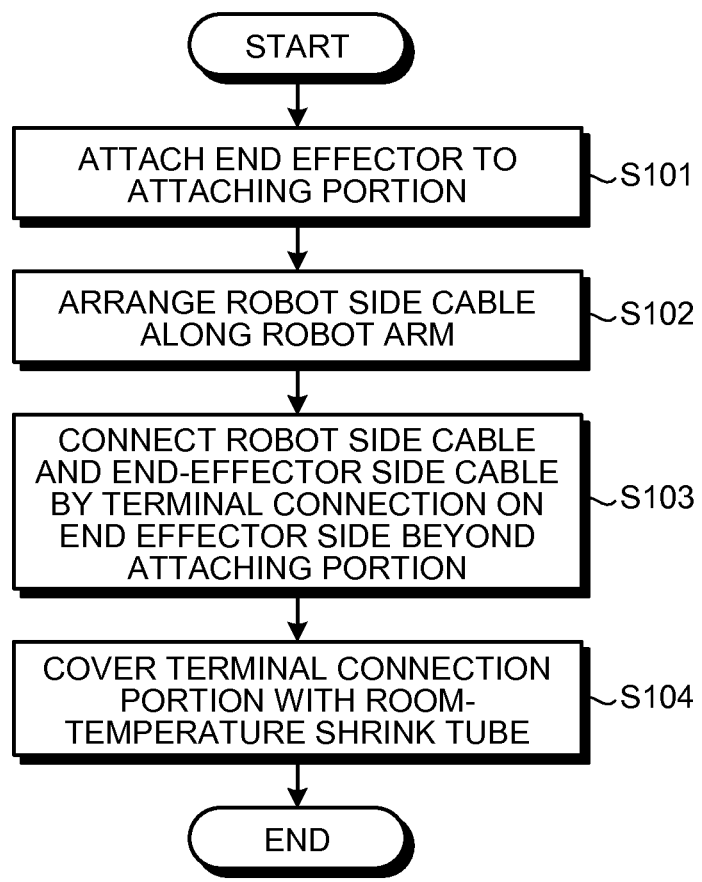

ROBOT AND MANUFACTURING METHOD OF THE SAME

CROSS-REFERENCE TO RELATED APPLICATIONS

This application is based upon and claims the benefit of priority of the prior Japanese Patent Application No. 2013-156047, filed on Jul. 26, 2013; and Japanese Patent Application No. 2013-194709, filed on Sep. 19, 2013, the entire contents of both of which are incorporated herein by reference.

FIELD

The embodiment discussed herein is directed to a robot and a manufacturing method of the same.

BACKGROUND

Japanese Patent No. 5151513 discloses a robot that includes a robot arm and an end effector (e.g., a spot welding gun) that is attached to a wrist portion on the end side of the robot arm, and performs a given work with the end effector.

SUMMARY

A robot according to an aspect of an embodiment includes a robot arm, an attaching portion, an end effector, an end-effector-side cable, and a robot-side cable. The attaching portion is provided on a leading end of the robot arm. The end effector is attached to the attaching portion. The end-effector-side cable extends from the end effector. The robot-side cable is arranged along the robot arm and is connected to the end-effector-side cable by terminal connection at a position closer to the end effector than the attaching portion.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 5 is a flowchart illustrating a manufacturing process of the robot in the embodiment.

DESCRIPTION OF EMBODIMENT

With reference to the accompanying drawings, the following describes in detail an embodiment of a robot and a manufacturing method of the same disclosed in the present application. The invention, however, is not limited by the following embodiment.

Figure 1:
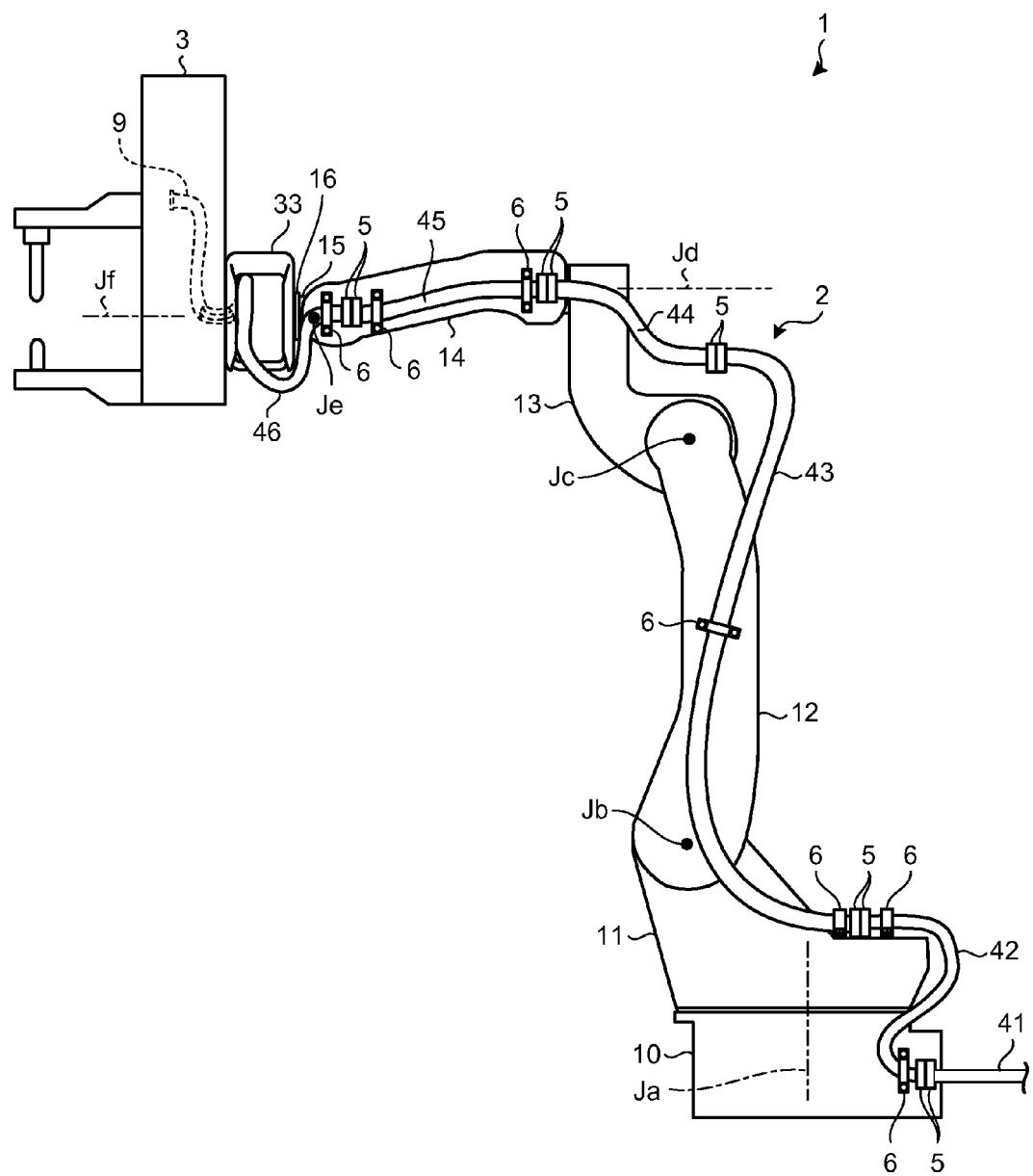
FIG. 1 is a general view schematically illustrating a robot according to an embodiment.

FIG. 1 is a general view schematically illustrating the robot according to the embodiment. A robot 1, as illustrated in FIG. 1, is an articulated robot that has a plurality of links and a plurality of rotor shafts (articulated shafts) Ja to Jf connecting the respective links.

In detail, the robot 1 includes a robot arm 2, an attaching portion 33 provided on the leading end of the robot arm 2 via a coupling portion 16, and an end effector 3 attached to the attaching portion 33. The robot arm 2 includes, as the links, a base 10, a revolving superstructure 11, a first arm 12, a second arm 13, a third arm 14, and a fourth arm 15. The revolving superstructure 11, the first arm 12, the second arm 13, the third arm 14, and the fourth arm 15 are rotatably connected with one another.

Specifically, the revolving superstructure 11 is connected to be rotatable about the rotor shaft Ja with respect to the base 10, and the first arm 12 is connected to be rotatable about the rotor shaft Jb, which is perpendicular to the rotor shaft Ja, with respect to the revolving superstructure 11. The second arm 13 is connected to be rotatable about the rotor shaft Jc, which is in parallel with the rotor shaft Jb, with respect to the first arm 12, and the third arm 14 is connected to be rotatable about the rotor shaft Jd, which is perpendicular to the rotor shaft Jc, with respect to the second arm 13.

The fourth arm 15 is connected to be rotatable about the rotor shaft Je, which is perpendicular to the rotor shaft Jd, with respect to the third arm 14, and the attaching portion 33 is connected to be rotatable about the rotor shaft Jf, which is perpendicular to the rotor shaft Je, with respect to the fourth arm 15.

The above-described terms such as "perpendicular" and "parallel" do not necessarily need to be precisely accurate in a mathematical sense, and thus practical tolerance and errors are permitted. Furthermore, the term "perpendicular" in the specification does not only mean that two lines (rotor shafts, for example) intersect at right angles on the same plane, but also means a situation in which the two lines are in the relation of being skewed.

The robot 1 further includes actuators Ma to Mf (omitted to illustrate) that rotationally drive the revolving superstructure 11, the first arm 12, the second arm 13, the third arm 14, the fourth arm 15, and the attaching portion 33 in the foregoing. The respective actuators Ma to Mf are specifically servo motors, for example.

While the actuators Ma to Mf are defined as servo motors in the foregoing, they are not limited to those and may be other types of motors, for example, hydraulic motors. In the following description, the actuator is described as "motor".

The following describes the respective motors Ma to Mf. The motor Ma is connected to the revolving superstructure 11 and rotationally drives the revolving superstructure 11. The motor Mb is connected to the first arm 12 and rotationally drives the first arm 12, while the motor Mc is connected to the second arm 13 and rotationally drives the second arm 13.

The motor Md is connected to the third arm 14 and rotationally drives the third arm 14, while the motor Me is connected to the fourth arm 15 and rotationally drives the fourth arm 15. Likewise, the motor Mf is connected to the attaching portion 33 and rotationally drives the attaching portion 33. The foregoing motors Ma to Mf receive signals representing operating instructions from a control device not depicted, and based on the signals, the operation thereof is controlled.

Furthermore, the end effector 3 is a spot welding gun, for example. Such an end effector 3 is attached to the attaching portion 33. The attaching portion 33 will be described later with reference to FIG. 2.

The end effector 3 is not limited to a spot welding gun. For example, the end effector 3 may be a welding torch, and may be a robot hand that grasps or sticks fast to a work piece when the robot 1 performs other work such as conveying work pieces.

The robot 1 thus configured performs a given work, for example, welding on a work piece not depicted, while appropriately changing the position and the angle of the end effector 3 by the operation of the motors Ma to Mf being controlled by the control device.

As in the foregoing, the robot 1 is configured such that one end effector 3 out of a plurality of types can be selectively attached depending on the specification, specifically, depending on the details of work and use. The robot 1 here is assumed to include a spot welding gun as the end effector 3 as described above.

Furthermore, the robot 1 is arranged with robot side cables 41 to 46, which can be divided into multiple pieces and include therein a plurality of cables such as a power cable to supply the power and a cable to supply a control signal from the robot 1 side to the end effector 3, along the robot arm 2.

As for the robot side cables 41 to 46, it is assumed that a conduit cable, which includes therein a power cable, an air hose, and a cooling water hose according to the type of the end effector 3, is selected and arranged. The power cable is a cable to supply the power to the end effector 3, the air hose is a hose to supply air to drive the end effector 3, and the cooling water hose is a hose to supply cooling water used in the end effector 3.

While the robot side cables 41 to 46 are exemplified to include therein three cables in FIG. 1, the number of cables to include in the robot side cables 41 to 46 may be two or smaller, or may be four or larger. The types of cables and hoses are not limited to the foregoing.

The robot side cables 41 to 46 are connected to one another via connectors 5. The robot side cables 41 to 46 are then fixed as appropriate at a plurality of places on the side surfaces of the first to the third arms 12 to 14 with fasteners 6.

While the robot side cables 41 to 46 are exemplified to be arranged to be exposed on the outside of the robot arm 2 in FIG. 1, they are not limited to this. In other words, a part or the whole of the robot side cables 41 to 46 may be arranged to run through inside the robot arm 2 so as not to be exposed.

As in the foregoing, the robot 1 is arranged with the robot side cables 41 to 46, which can be divided into multiple pieces, along the robot arm 2. This allows a damaged portion of the cables to be selectively replaced when the cables are partially damaged, for example, and thus the robot 1 can improve the maintainability of the cables.

Furthermore, the robot side cables 41 to 46 are formed in an elongate shape and are made to be dividable into multiple pieces so as to line in the directions of axes. The robot side cables 41 to 46 are divided at the portions at which the frequency of driving is relatively high in the robot arm 2.

Specifically, the robot side cables 41 to 46 are divided into a first robot-side cable 41 and a second robot-side cable 42 near the base 10. The first robot-side cable 41 is connected on its one end with a power supplying device, an air supplying device, a cooling water supplying device, and others not depicted.

Furthermore, the robot side cables 41 to 46 are divided into the second robot-side cable 42 and a third robot-side cable 43 near the revolving superstructure 11, and are divided into the third robot-side cable 43 and a fourth robot-side cable 44 near the second arm 13.

The robot side cables 41 to 46 are divided into the fourth robot-side cable 44 and a fifth robot-side cable 45 near the connecting portion of the second arm 13 and the third arm 14. The robot side cables 41 to 46 are further divided into the fifth robot-side cable 45 and a sixth robot-side cable 46 near the connecting portion of the third arm 14 and the fourth arm 15.

While the robot side cables 41 to 46 are exemplified to be divided into six cables of the first to the sixth robot-side cables 41 to 46 in the foregoing, they are not limited to this and may be divided into two to five cables or into seven or more cables. An increase in the number of cables into which the robot side cables 41 to 46 are divided also allows the lengths of replacing cables to be shorter, whereby the maintenance cost can be lowered.

As in the foregoing, the robot side cables 41 to 46 are made to be dividable into multiple pieces at the portions at which the frequency of driving is relatively high in the robot arm 2 and the probability of getting damaged is thus higher to that extent, and are made to be coupled via the connectors 5. Consequently, a damaged portion can be selectively replaced out of the robot side cables 41 to 46, and thus the maintainability of the robot side cables 41 to 46 can be further improved.

Meanwhile, extending from the end effector 3 is an end-effector side cable 9. The end-effector side cable 9 includes therein, in the same manner as the robot side cables 41 to 46, a plurality of cables such as a power cable and a cable that supplies a control signal.

Such an end-effector side cable 9 and the sixth robot-side cable 46 are connected by terminal connection at a position closer to the end effector 3 than the attaching portion 33. This can improve the maintainability of the end-effector side cable 9 and the sixth robot-side cable 46.

Specifically, the fourth arm 15 and the attaching portion 33 that are provided toward the leading end of the robot arm 2 beyond the third arm 14 are the portions of higher driving frequency than other portions in the robot 1. Consequently, the end-effector side cable 9 and the sixth robot-side cable 46 that are arranged on the end side beyond the third arm 14 in the robot arm 2 are frequently flexed, and thus have higher frequency of being subjected to stress than that of the first to the fifth robot-side cables 41 to 45.

Furthermore, the power cable that supplies the power to the spot welding gun, for example, is heavier in weight as compared with other cables, and thus the end-effector side cable 9 and the sixth robot-side cable 46 that include therein the power cable are also subjected to a relatively large stress by their own weight. Moreover, because the end-effector side cable 9 is connected to the end effector 3 inside the end effector 3, the replacement work is cumbersome when damaged.

Hence, the robot 1 is so arranged that the end-effector side cable 9 and the sixth robot-side cable 46 are connected by terminal connection at a position closer to the end effector 3 than the attaching portion 33. This makes mainly the sixth robot-side cable 46 in the robot 1 bend when the fourth arm 15 is swung about the rotor shaft Je or when the attaching portion 33 is rotated about the rotor shaft Jf, and thus can restrain the bending of the end-effector side cable 9.

As a consequence, according to the robot 1, lessening the damage to the end-effector side cable 9 reduces the number of replacements of the end-effector side cable 9 that require cumbersome work, and thus the maintainability can be improved.

Furthermore, when the end-effector side cable 9 and the sixth robot-side cable 46 are connected via connectors, for example, the weight of the connectors is imposed on the end-effector side cable 9 and the sixth robot-side cable 46 as stress.

Hence, the robot 1 is so arranged that the end-effector side cable 9 and the sixth robot-side cable 46 are connected by terminal connection. This can make the connecting portion of the end-effector side cable 9 and the sixth robot-side cable 46 lighter in weight than a connecting portion connected by connectors.

Consequently, according to the robot 1, the stress imposed on the end-effector side cable 9 and the sixth robot-side cable 46 is relieved, and thus the number of replacement work entailed in the damage to the end-effector side cable 9 and the sixth robot-side cable 46 can be reduced.

In the robot 1, the end-effector side cable 9 and the sixth robot-side cable 46 are connected by terminal connection without using connectors, and thus even when the connecting portion connected by terminal connection bumps into the other portions of the robot 1, the bumped portions can be prevented from being damaged.

Figure 2:
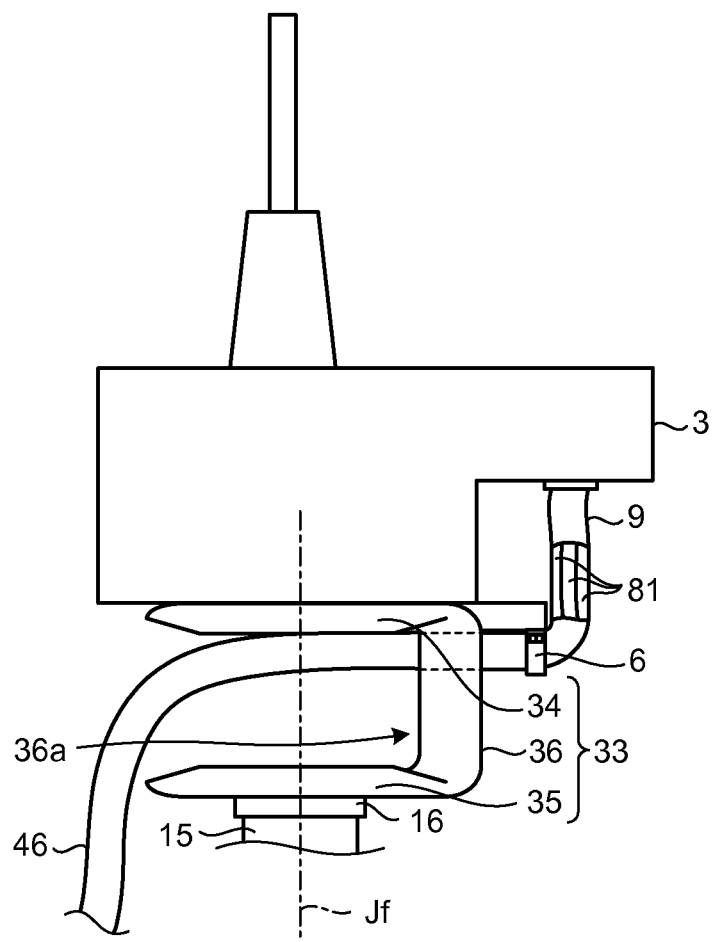
FIG. 2 is a top view schematically illustrating a coupling portion of an end effector and a robot arm in the embodiment.

Next, with reference to FIG. 2, the routing of the sixth robot-side cable 46 and the structure of the attaching portion 33 will be described more specifically. FIG. 2 is a top view schematically illustrating the coupling portion of the end effector 3 and the robot arm 2 in the embodiment.

As illustrated in FIG. 2, the end effector 3 is attached to the attaching portion 33. The attaching portion 33 is coupled with the fourth arm 15 via the coupling portion 16. The attaching portion 33 has a front wall 34, a back wall 35, and a right wall 36, which are all bent at substantially right angles. The front wall 34, the back wall 35, and the right wall 36 are integrally formed so as to transmit stress to one another.

The right wall 36 includes a through hole 36a that runs through in a direction to intersect the extending direction of the fourth arm 15 (the rotor shaft Jf in FIG. 2) that is the end arm in the robot arm 2. The sixth robot-side cable 46 is inserted through the through hole 36a. In the attaching portion 33 thus structured, the front wall 34 is attached to the back surface of the end effector 3.

The sixth robot-side cable 46 is then arranged to intersect the extending direction of the fourth arm 15 (the rotor shaft Jf in FIG. 2) that is the end arm in the robot arm 2. Specifically, in top view, the sixth robot-side cable 46 is arranged from the left side of the fourth arm 15 through the through hole 36a in the right wall 36 of the attaching portion 33, drawn out to the right side of the end effector 3, and then connected to the end-effector side cable 9 by terminal connection at a position closer to the end effector 3 than the attaching portion 33. The sixth robot-side cable 46 is fixed to the attaching portion 33 with the fastener 6 at the portion drawn out from the through hole 36a.

At the terminal connection portion of the end-effector side cable 9 and the sixth robot-side cable 46, each of the cables included therein is covered with a room-temperature shrink tube 81. This point will be described later with reference to FIGS. 4A to 4C.

As in the foregoing, because the sixth robot-side cable 46 is inserted through the through hole 36a in the right wall 36 of the attaching portion 33, a part of its own weight can be put on the attaching portion 33. This can reduce the own weight imposed on the sixth robot-side cable 46 itself, and thus the damage to the sixth robot-side cable 46 by the own weight can be lessened.

While the sixth robot-side cable 46 here is exemplified to be inserted through the through hole 36a in the right wall 36 of the attaching portion 33, the sixth robot-side cable 46 may be arranged to intersect over either of the fourth arm 15 and the third arm 14 when the attaching portion 33 is not provided.

As in the foregoing, even when the sixth robot-side cable 46 is arranged, the own weight imposed on the sixth robot-side cable 46 itself can be reduced, and thus the damage to the sixth robot-side cable 46 by the own weight can be lessened.

Furthermore, the sixth robot-side cable 46 is wound around the attaching portion 33 when the end effector 3 is rotated about the rotor shaft Jf. At this time, by the front wall 34 and the back wall 35, the attaching portion 33 serves as a guide that restricts the winding direction of the sixth robot-side cable 46.

Specifically, the front wall 34 restricts the sixth robot-side cable 46 to jump out from the attaching portion 33 toward the end effector 3 side. Meanwhile, the back wall 35 restricts the sixth robot-side cable 46 to jump out from the attaching portion 33 toward the robot arm 2 side. Consequently, when the end effector 3 is rotated about the rotor shaft Jf, the damage by the disarray of the sixth robot-side cable 46 that is wound around the attaching portion 33 can be lessened.

As in the foregoing, in the robot 1, the damage by the own weight of the sixth robot-side cable 46 and the damage by the disarray of the sixth robot-side cable 46 at the time of the rotation of the end effector 3 can be lessened. Consequently, according to the robot 1, reducing the number of replacement work entailed in the damage to the sixth robot-side cable 46 can improve the maintainability.

Next, with reference to FIGS. 3A to 3C and 4A to 4C, described is the method of connecting the sixth robot-side cable 46 and the end-effector side cable 9 by terminal connection. FIGS. 3A to 3C and 4A to 4C are explanatory diagrams illustrating the terminal connection method in the embodiment.

Each of the cables included within the sixth robot-side cable 46 and the end-effector side cable 9 is connected in the same manner by terminal connection. Thus, the terminal connection method of power cables included in the sixth robot-side cable 46 and the end-effector side cable 9 is described here, and the description of the terminal connection method for the other cables is omitted.

Figure 3A:
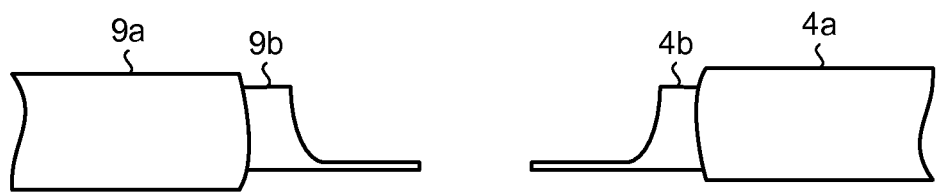
FIGS. 3A to 3C and 4A to 4C are explanatory diagrams illustrating a terminal connection method in the embodiment.

As illustrated in FIG. 3A, the end portion of a power cable 9a in the end-effector side cable 9 is provided with a solderless terminal 9b. The end portion of a power cable 4a in the sixth robot-side cable 46 is provided also with a solderless terminal 4b in the same manner.

While a round tongue type (R terminal, ring terminal) is used for the solderless terminals 4b and 9b here, the solderless terminals 4b and 9b are not limited to the round tongue type. That is, the solderless terminals of any types and shapes, for example, a spade tongue type (Y terminal), a straight sleeve type, and a flared sleeve type may be used as the solderless terminals 4b and 9b.

When connecting the two power cables 9a and 4a by terminal connection, either one of the two power cables 9a and 4a is kept inserted through a later-described room-temperature shrink tube 81 (see FIG. 4A) in advance.

Figure 3B:
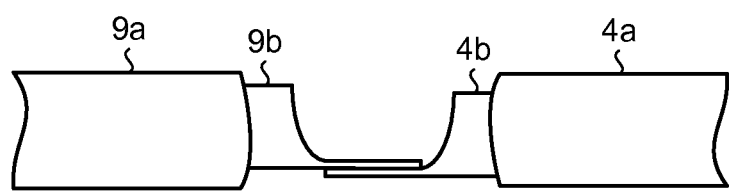
Figure 3C:
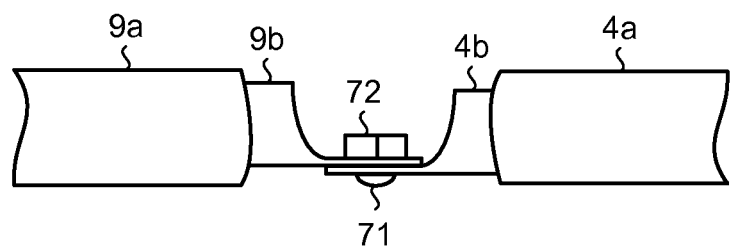

Then, as illustrated in FIG. 3B, the solderless terminals 9b and 4b of the two power cables 9a and 4a are laid one on top of the other such that the positions of the round holes of the solderless terminals 9b and 4b are aligned. Subsequently, as illustrated in FIG. 3C, a screw 71 is inserted through the round holes of the solderless terminals 9b and 4b, and then a nut 72 and the screw 71 are screwed together to connect the two power cables 9a and 4a by terminal connection.

Figure 4A:
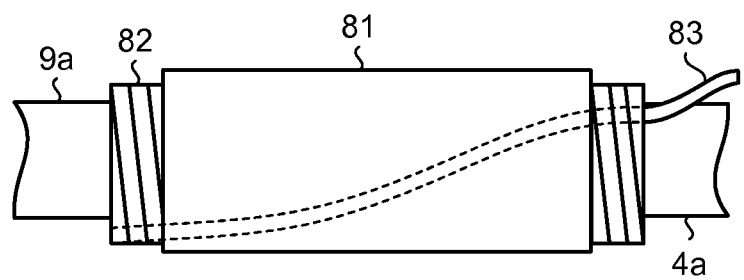

Then, as illustrated in FIG. 4A, the room-temperature shrink tube 81 is moved over to the terminal connection portion of the power cables 9a and 4a. At this time, the room-temperature shrink tube 81 is moved up to the position in which the solderless terminals 9b and 4b in terminal connection are covered over with the room-temperature shrink tube 81.

Such a room-temperature shrink tube 81 is formed of an insulating material including rubber, for example, and in a state of the diameter thereof being expanded in advance, a tubular core 82 is inserted inside. The core 82 is formed with an elongated piece 83 of resin being wound in a spiral manner, and is a tube the diameter of which is larger than those of the power cables 9a and 4a, for example. The elongated piece 83 constituting the core 82 is wound in a spiral manner from one end of the core 82 toward the other end to form the core 82, and the end portion of the elongated piece 83 is passed through the inside of the core 82 and drawn out from the one end side of the core 82.

Figure 4B:
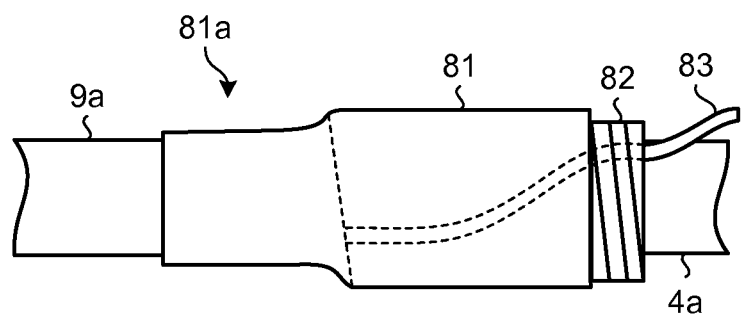

Then, as illustrated in FIG. 4B, when the elongated piece 83 drawn out from the one end side of the core 82 is pulled, the elongated piece 83 is loosened from the other end side of the core 82, and a portion 81a of the room-temperature shrink tube 81 for which the elongated piece 83 is loosened shrinks in sequence.

Subsequently, the elongated piece 83 is completely loosened and removed from the inside of the room-temperature shrink tube 81. Consequently, as illustrated in FIG. 4C, the whole room-temperature shrink tube 81 shrinks, and the terminal connection portion of the power cables 9a and 4a is covered with the room-temperature shrink tube 81.

The terminal connection portion of the power cables 9a and 4a is covered with the insulative room-temperature shrink tube 81 in this manner, and thus the safety is improved. Furthermore, by the terminal connection method in the foregoing, when the cables need to be replaced due to a change in specification of the robot 1 or other reasons, simply changing the end portions of the new cables to be used into the solderless terminals 9b and 4b allows the change of use easily.

Moreover, by the terminal connection method in the foregoing, simply pulling out the elongated piece 83 from the room-temperature shrink tube 81 can cover the terminal connection portion of the power cables 9a and 4a with the room-temperature shrink tube 81 without using any special tools, and thus the maintainability is improved.

Figure 4C:
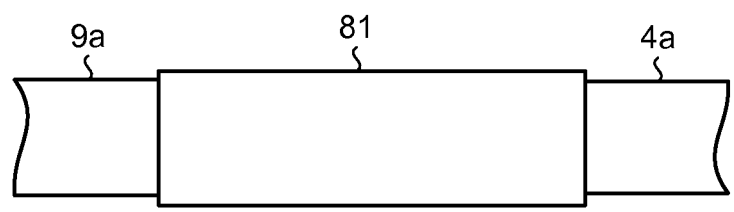

Furthermore, as illustrated in FIG. 4C, the diameter of the terminal connection portion of the power cables 9a and 4a covered with the room-temperature shrink tube 81 is substantially the same as those of the power cables 9a and 4a. Consequently, the power cables 9a and 4a connected by the above-described terminal connection method can restrain the terminal connection portion from interfering with cable handling.

In addition, the terminal connection portion of the power cables 9a and 4a connected by the above-described terminal connection method is lighter in weight than a connecting portion connected via connectors, for example. Consequently, the terminal connection portion can be prevented from imposing stress on the end-effector side cable 9 and the sixth robot-side cable 46.

Next, with reference to FIG. 5, the method of manufacturing the robot 1 in the embodiment will be described. FIG. 5 is a flowchart illustrating a manufacturing process of the robot 1 in the embodiment. As illustrated in FIG. 5, in the process of manufacturing the robot 1, the end effector 3 is first attached to the attaching portion 33 that is provided on the leading end of the robot arm 2 (Step S101).

The robot side cables 41 to 46 are then arranged along the robot arm 2 (Step S102). Subsequently, the robot side cables 41 to 46 and the end-effector side cable 9 are connected by terminal connection at a position closer to the end effector 3 than the attaching portion 33 (Step S103). Lastly, the terminal connection portion is covered with the room-temperature shrink tube 81 (Step S104), and this completes the robot 1.

As in the foregoing, the robot 1 in the embodiment includes the robot arm 2, the attaching portion 33, the end effector 3, the end-effector side cable 9, and the robot side cables 41 to 46.

The attaching portion 33 is provided on the leading end of the robot arm 2. The end effector 3 is attached to the attaching portion 33. The end-effector side cable 9 extends from the end effector 3. The robot side cables 41 to 46 are arranged along the robot arm 2, and are connected to the end-effector side cable 9 by terminal connection at a position closer to the end effector 3 than the attaching portion 33. According to such a robot 1, the maintainability of the arranged cables can be improved.

While the sixth robot-side cable 46 and the end-effector side cable 9 are exemplified to be connected by terminal connection in the above-described embodiment, the first to the fifth robot-side cables 41 to 45 may be connected by the terminal connection method illustrated in FIGS. 3A to 3C and 4A to 4C.

Consequently, similarly to the sixth robot-side cable 46 and the end-effector side cable 9, the first to the fifth robot-side cables 41 to 45 can be prevented from being damaged and the maintainability can be improved.

While the first to the fifth robot-side cables 41 to 45 are arranged on the right side surface of the robot arm 2, and the sixth robot-side cable 46 and the end-effector side cable 9 are connected by terminal connection on the left side of the robot arm 2 in the foregoing embodiment, the arranging positions may be opposite.

For example, when the end-effector side cable 9 extends from the right side of the end effector 3, the first to the fifth robot-side cables 41 to 45 are arranged on the left side surface of the robot arm 2. Then, the sixth robot-side cable 46 and the end-effector side cable 9 are connected by terminal connection on the right side of the robot arm 2.

This can put a part of the own weight of the sixth robot-side cable 46 on the attaching portion 33 even when the end-effector side cable 9 extends from the right side of the end effector 3. Consequently, the own weight imposed on the sixth robot-side cable 46 can be reduced, and thus the damage to the sixth robot-side cable 46 by the own weight can be lessened.

While the robot 1 has been exemplified with a six-axis robot in the foregoing embodiment, it is not limited to such a configuration, and a robot other than a six-axis robot, for example, a seven-axis robot and an eight-axis robot can be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
   a robot arm;
   an attaching portion provided on a leading end of the robot arm;
   an end effector attached to the attaching portion;
   an end-effector-side cable extending from the end effector; and
   a robot-side cable arranged along the robot arm and connected to the end-effector-side cable by terminal connection at a position closer to the end effector than the attaching portion, the robot-side cable intersecting the attaching portion, wherein
   the robot-side cable and the end-effector-side cable are connected by terminal connection with solderless terminals provided on end portions thereof.

2. The robot according to claim 1, wherein the robot-side cable and the end-effector-side cable include therein wiring through which power is supplied from the robot arm to the end effector of the robot.

3. The robot according to claim 1, further comprising a connection portion via which the robot-side cable is connected to the end-effector-side cable, wherein
   the connection portion is covered with an insulative tube.

4. The robot according to claim 2, further comprising a connection portion via which the robot-side cable is connected to the end-effector-side cable, wherein
   the connection portion is covered with an insulative tube.

5. The robot according to claim 1, wherein the end effector includes a spot welding gun.

6. The robot according to claim 2, wherein the end effector includes a spot welding gun.

7. The robot according to claim 3, wherein the end effector includes a spot welding gun.

8. The robot according to claim 4, wherein the end effector includes a spot welding gun.

9. The robot according to claim 1, wherein
   the attaching portion includes a through hole running through the attaching portion in a direction to intersect the extending direction, and
   the robot-side cable is inserted through the through hole.

10. A method of manufacturing a robot comprising:
    attaching an end effector to an attaching portion provided on a leading end of a robot arm;
    arranging a robot-side cable along the robot arm so as to intersect the attaching portion; and
    connecting the robot-side cable and an end-effector-side cable extending from the end effector at a position closer to the end effector than the attaching portion by terminal connection with solderless terminals provided on end portions of the robot-side cable and the end-effector-side cable.

11. A robot comprising:
    a robot arm;
    an end effector;
    means for attaching the end effector to a leading end of the robot arm;
    first transmission means for transmitting an object to be used for an operation of the robot, the first transmission means arranged along the robot arm so as to intersect the means for attaching the end effector; and
    second transmission means for transmitting the object to be used for the operation of the robot, the second transmission means extending from the end effector, wherein
    the first second transmission means are connected at a position closer to the end effector than the means for attaching by terminal connection with solderless terminals provided on end portions of the first second transmission means.

* * * * *